Feb. 18, 1958  A. A. CHERAMIE  2,823,637
PONTOON WHEELS
Filed Oct. 13, 1954  3 Sheets-Sheet 1
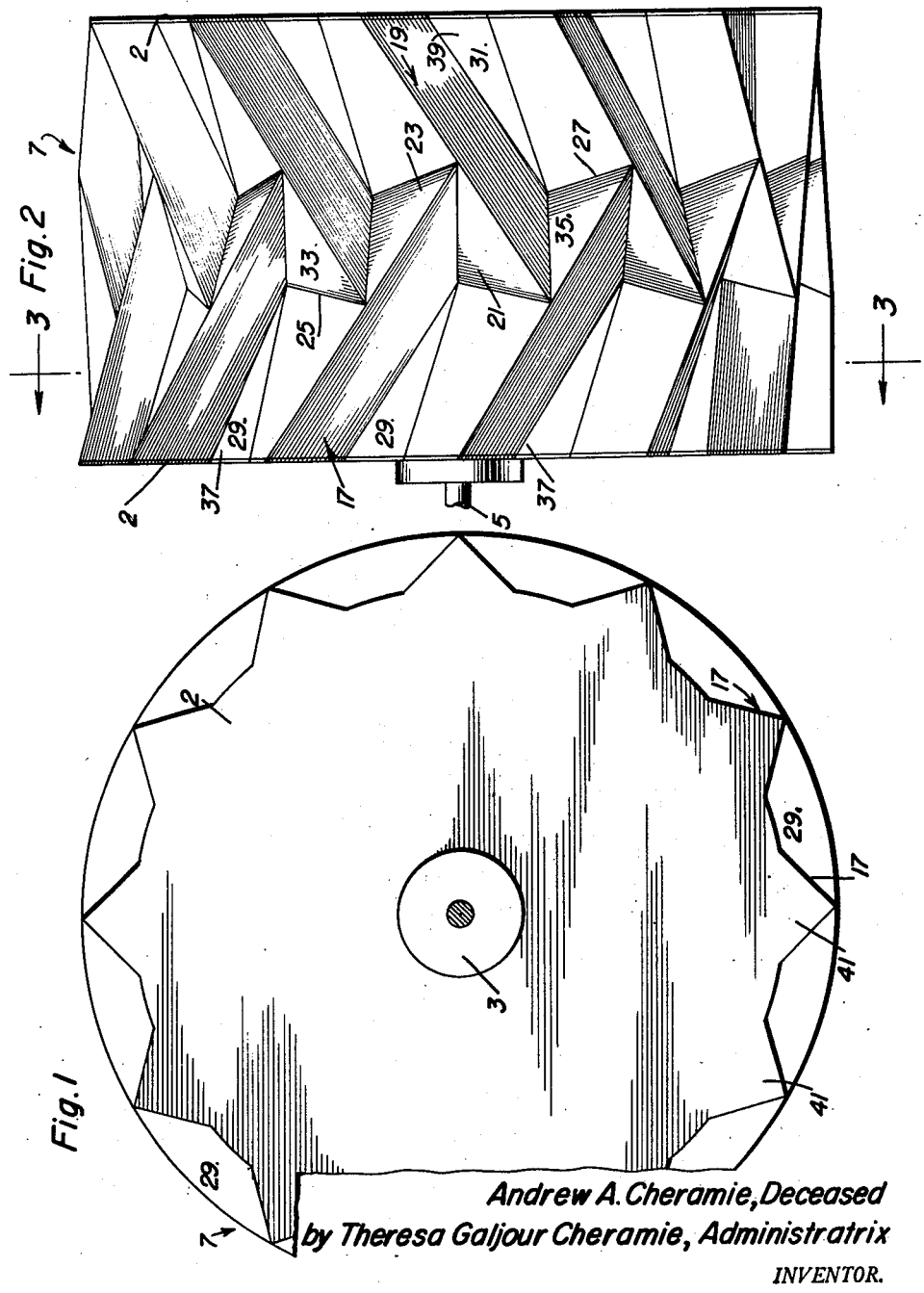
Andrew A. Cheramie, Deceased
by Theresa Galjour Cheramie, Administratrix
INVENTOR.
BY *Clarence A. O'Brien*
*and Harvey B. Jacobson*
Attorneys

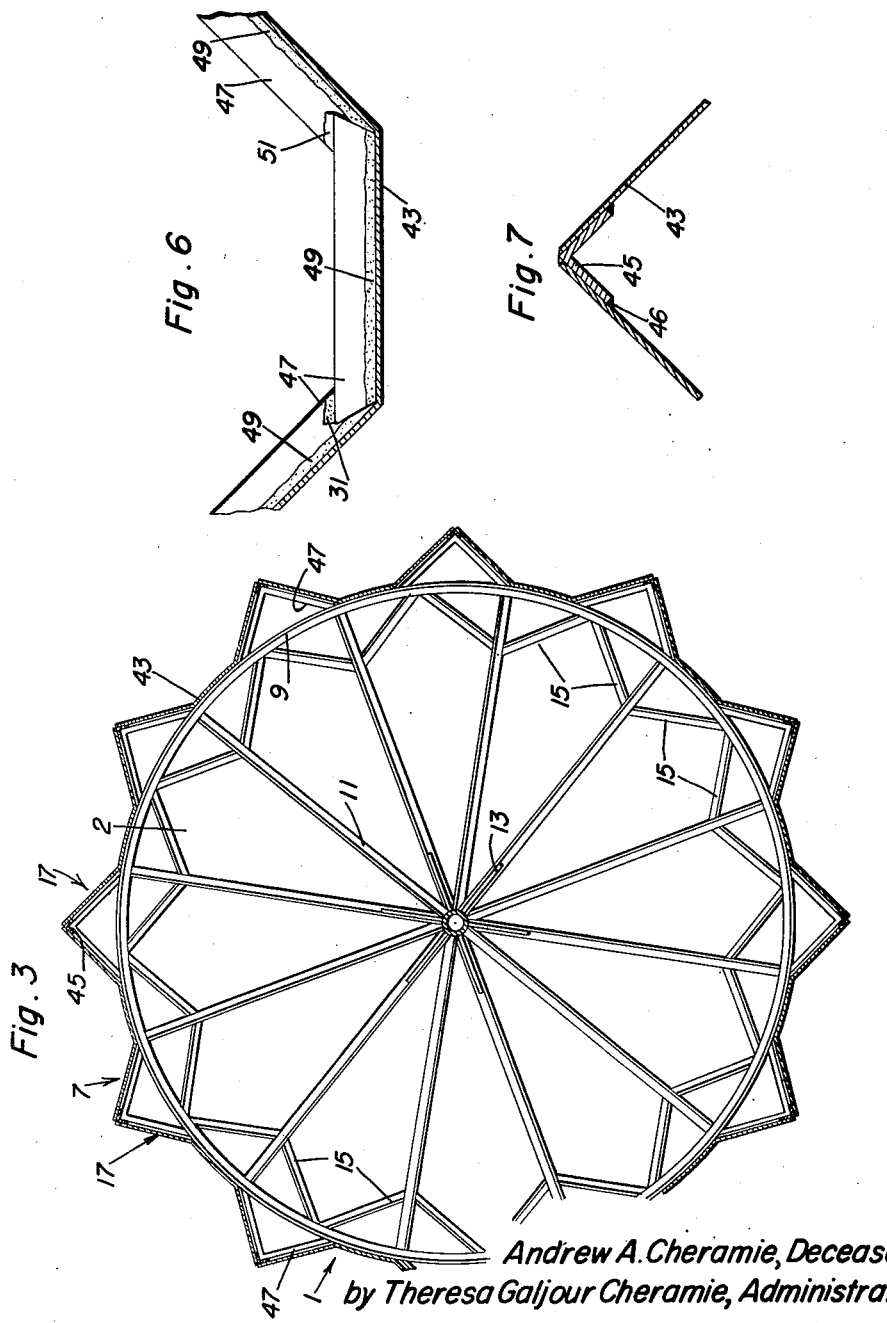

Feb. 18, 1958     A. A. CHERAMIE     2,823,637
PONTOON WHEELS
Filed Oct. 13, 1954     3 Sheets-Sheet 3
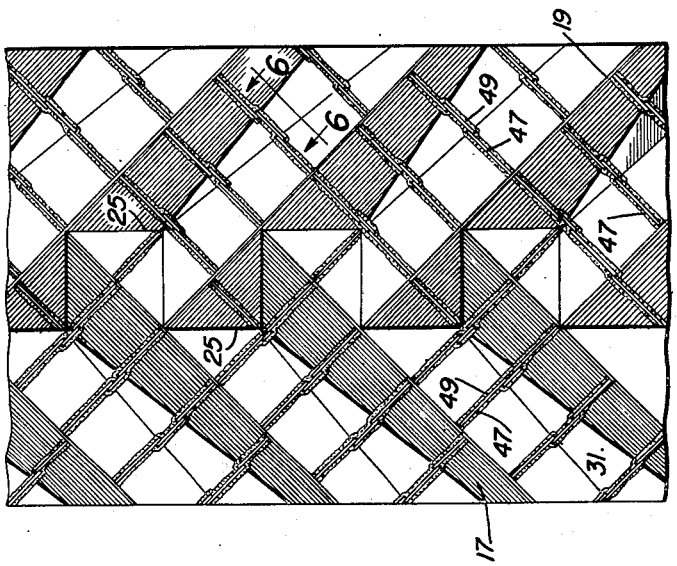
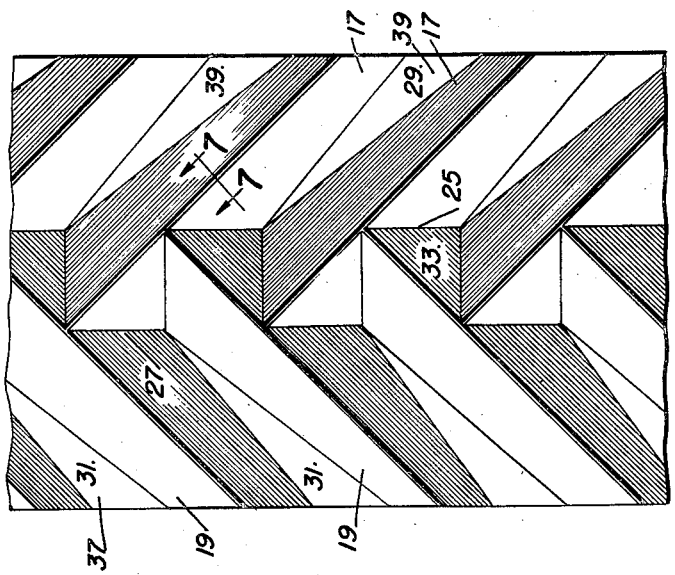
Andrew A. Cheramie, Deceased
by Theresa Galjour Chermie, Administratrix
INVENTOR.

United States Patent Office 2,823,637
Patented Feb. 18, 1958

2,823,637

PONTOON WHEELS

Andrew A. Cheramie, deceased, late of Cut Off, La., by Theresa Galjour Cheramie, administratrix, Cut Off, La.

Application October 13, 1954, Serial No. 462,019

6 Claims. (Cl. 115—1)

This invention relates to pontoon wheels for combination land and water vehicles such as disclosed in U. S. Letters Patent No. 2,671,519 dated March 9, 1954 and for which this invention is especially designed as an improvement.

The primary object of this invention is to provide a combination wheel with a tread having ribs and troughs adapting the wheel when power driven for more effective operation as a marine propeller in water and as a traction wheel on land than wheels of commerce designed for similar purposes.

Another object is to provide a wheel with a tread for the above purpose and in which side slippage both in water and on land is reduced to a minimum by the arrangement of the ribs and grooves of the tread.

Other and subordinate objects together with the precise nature of my improvements will become apparent when the succeeding description and claims are read with reference to the accompanying drawings in which:

Figure 1 is a view in side elevation of the improved wheel in a preferred embodiment thereof;

Figure 2 is a view in elevation looking at the tread band of the wheel;

Figure 3 is a view in vertical section taken on the line 3—3 of Figure 2;

Figure 4 is a fragmentary plan view of a portion of the tread band shown in flat condition and rotated 180° relative to Figure 2;

Figure 5 is a similar view in bottom plan of the tread band as shown in Figure 4;

Figure 6 is an enlarged fragmentary view in transverse section taken on the line 6—6 of Figure 5; and Figure 7 is an enlarged fragmentary view taken in the line 7—7 of Figure 4.

Referring to the drawings by numerals, the pontoon wheel of this invention comprises a closed drum 1, having sides 2, provided with hubs 3 suitably fixed on a tubular axle 5 adapted to be driven, a tread band designated generally by the numeral 7 annular internal rings 9 supporting the tread band 7 at the side edges thereof and one of which is shown in Figure 3, and spokes 11 radiating from the axle 5 to said rings. The spokes 11 may be braced at the inner ends thereof to the axle 5 as shown at 13. The rings 9 as shown in connection with the one illustrated are braced to outer end portions of said spokes, by pairs of angularly arranged angle bars 15 between adjacent spokes suitably connected to said tread band 7 and spokes.

The tread band 7 is formed with two circumferential side by side series of hollow peripheral ribs 17, 19 extending from the sides 2 of the bands inwardly of said band in alternate relation in each series with respect to the other series.

The ribs 17, 19 in each series extend obliquely transversely of the tread band 7 and are right angled in cross section, and disposed at obtuse angles in each series to those in the other series. The ribs 17, 19 have inner ends 21, 23 alternating in overlapping relation in the circumferential center of the band 7 and joined, as at 25, 27, in each series to one side of the ribs in the other series so that the ribs 17, 19 in each series form with the ends 21, 23 of the ribs of the other series circumferential series of troughs 29, 31 alternating with the ribs 17, 19 of the series and which having closed inner ends 33, 35. Also the ribs 17, 19 in each series taper laterally toward the side edges of the band so that adjacent ribs 17, 19 in each series diverge from their inner ends 21, 23 to the sides 2 of the drum 1. The troughs 29, 31 have flat bottoms 37, 39 of wedge shape and outer ends open at the sides 2 of the drum 1 and said troughs 29, 31 in each series extend obliquely of the tread band 7 like the ribs 17, 19. The sides 2 are provided with wedge shaped edge ears as at 41 closing the outer ends of the ribs 17, 19.

The described tread band 7 may be formed in any suitable manner for instance as best shown in Figure 3 of channel sections 43 connected along the longitudinal ridges of the ribs 17, 19 by angle bars 45 welded inside said ribs as at 46 (see Figure 7). The ribs 17, 19 and troughs 29, 31 are reinforced on the inner side of the tread band as shown in Figures 3 and 5 by suitable cross bars 47 welded as at 49 to said sections 43 and (see Figure 6) to each other as at 51.

As will be seen the ribs 17, 19 function on land as traction cleats and in the water as paddle blades and the troughs provide the requisite clearance between said ribs 17, 19 for maximum efficiency of said ribs in operation. The oblique relatively angular relation of the ribs 17, 19 in the series reduces side slippage of the drum 7 either on land or in water to a minimum in operation of the drum in either direction and side slippage is further reduced by the closed inner ends 33, 35 of the troughs 29, 31. Obviously this adapts the drum or pontoon 1 for highly efficient in marshes and the like.

The foregoing will, it is believed, suffice to impart a clear understanding of the invention without further explanation.

Manifestly the invention is susceptible of modification without departing from the inventive concept and right is herein reserved to modifications falling within the scope of the appended claims.

What is claimed as new is:

1. A combination paddle and traction wheel for use in water and on land comprising a closed drum having sides and a tread band, said tread band including two circumferential side by side series of hollow ribs of right angled cross section extending inwardly of the band from said sides in alternating relation in each series relative to the other series, the ribs in each series extending obliquely transversely of the band and at obtuse angles in each series to those in the other series, the ribs having inner ends alternating in overlapping relation in the circumferential center of the band, the inner ends of the ribs in each series being joined to one side of the ribs in the other series, said wheel having sides provided with wedge-shaped ears closing the outer ends of said ribs.

2. A combination paddle and traction wheel according to claim 1, the ribs in each series forming with the ribs of the other series troughs between the ribs of each series having closed inner ends and outer ends open at the sides of the wheel between said ears.

3. A combination paddle and traction wheel according to claim 2, said ribs in the series tapering laterally toward said sides and said troughs having wedge-shaped flat bottoms flaring toward the outer ends of said troughs.

4. A combination paddle and traction wheel comprising a pair of spaced side plates and a tread band, said tread band extending between and being connected to said side plates to form a closed drum like member having a buoyant effect, said tread band including two circumferentially arranged series of hollow ribs having outermost peripheral edges, ribs of each of said series being in side by side relation and in angular relation to the axis of the wheel with ribs of one of said series overlapping the ribs of the other of said series, the inner end of each of said ribs terminating in intersecting relation with an intermediate portion of a rib of the opposite one of said series, each of said ribs tapering in height and being of a minimum height at the outer end thereof, intersecting parts of all of said ribs being of the same height at their point of intersecting.

5. A combination paddle and traction wheel comprising a pair of spaced side plates and a tread band, said tread band extending between and being connected to said side plates to form a closed drum like member having a buoyant effect, said tread band including two circumferentially arranged series of ribs having outermost peripheral edges, ribs of each of said series being in side by side relation and in angular relation to the axis of the wheel with ribs of one of said series overlapping the ribs of the other of said series, the inner end of each of said ribs terminating in intersecting relation with an intermediate portion of a rib of the opposite one of said series, each of said ribs tapering in height and being of a minimum height at the outer end thereof, intersecting parts of all of said ribs being of the same height at their point of intersecting.

6. A combination paddle and traction wheel comprising a pair of spaced side plates and a tread band, said tread band extending between and being connected to said side plates to form a closed drum like member having a buoyant effect, said tread band including two circumferentially arranged series of hollow ribs having outermost peripheral edges, ribs of each of said series being in side by side relation and in angular relation to the axis of the wheel with ribs of one of said series overlapping the ribs of the other of said series, the inner end of each of said ribs terminating in intersecting relation with an intermediate portion of a rib of the opposite one of said series, each of said ribs tapering in height and being of a minimum height at the outer end thereof, intersecting parts of all of said ribs being of the same height at their point of intersecting, said side plates having circumferentially spaced projecting ears closing the outer ends of said ribs.

References Cited in the file of this patent

UNITED STATES PATENTS

| | | |
|---|---|---|
| 1,547,265 | Ramsey | July 28, 1925 |
| 2,203,617 | Hale | June 4, 1940 |
| 2,290,616 | Saurer | July 21, 1942 |
| 2,432,107 | Williams | Dec. 9, 1943 |
| 2,725,109 | Bouvier | Nov. 29, 1955 |